United States Patent
Torsner et al.

(10) Patent No.: US 8,634,315 B2
(45) Date of Patent: Jan. 21, 2014

(54) METHOD AND ARRANGEMENT FOR TRANSMITTING A DATA UNIT IN A WIRELESS COMMUNICATIONS SYSTEM

(75) Inventors: Per Johan Torsner, Masaby (FI); Janne Peisa, Espoo (FI); Mats Sagfors, Kyrkslatt (FI); Stefan Wager, Espoo (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 384 days.

(21) Appl. No.: 12/864,850

(22) PCT Filed: Dec. 17, 2008

(86) PCT No.: PCT/SE2008/051477
§ 371 (c)(1),
(2), (4) Date: Jul. 27, 2010

(87) PCT Pub. No.: WO2009/096848
PCT Pub. Date: Aug. 6, 2009

(65) Prior Publication Data
US 2010/0309892 A1    Dec. 9, 2010

Related U.S. Application Data

(60) Provisional application No. 61/025,480, filed on Feb. 1, 2008.

(51) Int. Cl.
*H04J 1/16* (2006.01)
(52) U.S. Cl.
USPC .............................................. 370/252; 455/69
(58) Field of Classification Search
USPC ......... 370/252, 253, 318, 319, 320, 321, 336, 370/337; 455/69, 500, 502, 418, 420
See application file for complete search history.

(56) References Cited

U.S. PATENT DOCUMENTS

2005/0250454 A1  11/2005  Sebire et al.
2006/0007886 A1   1/2006  Lee et al.

FOREIGN PATENT DOCUMENTS

| CN | 1914879 A | 2/2007 |
| CN | 1996821 A | 7/2007 |
| WO | 2005/109730 A1 | 11/2005 |

OTHER PUBLICATIONS

Search Report dated Nov. 26, 2012 issued by the State Intellectual Property Office of People's Republic China for CN Application No. 200880126300.7 filed Dec. 17, 2008, p. 1.

*Primary Examiner* — Huy D. Vu
*Assistant Examiner* — Dady Chery
(74) *Attorney, Agent, or Firm* — Coats & Bennett, P.L.L.C.

(57) ABSTRACT

An object of the present invention is to provide a mechanism for improving coverage in a wireless communications system. The object is achieved by a method in a sending node (210) for transmitting a data unit to a receiving node (220). The data unit comprises a number of bits. The sending node (210) and the receiving node (220) are both comprised in a wireless communications system (200). According to the method, the sending node (210) obtains (606, 810) a value n associated with the data unit. Then, the sending node (210) selects (608, 814) a transmission time instance depending on n, such that a function exists that uniquely associates the selected transmission time instance with n. Finally, the sending node (210) transmits (612, 818) the data unit to the receiving node (220) in the selected transmission time instance, without the value n.

28 Claims, 7 Drawing Sheets

METHOD AND ARRANGEMENT FOR TRANSMITTING A DATA UNIT IN A WIRELESS COMMUNICATIONS SYSTEM

TECHNICAL FIELD

The present invention relates to a method and arrangement for transmitting a data unit in a wireless communications system.

BACKGROUND

The Third Generation mobile cellular technology, also known as the Universal Mobile Telecommunications System (UMTS), is based on wideband code division multiple access (WCDMA) radio technology, which offers greater spectral efficiency and higher bandwidth than earlier systems. The radio access network part of a UMTS system is referred to as the UMTS Radio Access Network (UTRAN).

The Third Generation Partnership Project (3GPP) is responsible for the development of standards relating to WCDMA and UTRAN.

The High Speed Downlink Packet Access (HSDPA), a part of the WCDMA standard, has introduced a new downlink transport channel, potentially increasing download speeds to more than 10 Mbit/s. The uplink equivalent, High Speed Uplink Packet Access (HSUPA), is sometimes referred to as Enhanced Uplink (EUL). Together, these two technologies are known as High Speed Packet Access (HSPA). The performance increase provided by HSPA will further improve the end-user experience for web access, file download/upload, voice over IP (VoIP) and streaming services.

Similarly to many other communication systems, the processing in WCDMA is structured into different protocol layers, one of which is the Medium Access Control (MAC) layer. The MAC layer provides logical channel multiplexing, hybrid-ARQ retransmissions, and uplink and downlink scheduling. The MAC layer may be divided into several entities, where each entity is responsible for handling transmission on one or more transport channels. For example, MAC-b is the MAC entity that handles the broadcast channel.

Hybrid-ARQ (Automatic Repeat Request), also known as HARQ, is a method for correcting transmission errors where data units that are not acknowledged by the receiver are automatically retransmitted. Forward error correction bits are also added to the data to enable the receiver to detect if a packet has been incorrectly received.

In layered protocol structures, the data units that a layer receives from the layer above it are generally referred to as Service Data Units, SDU:s. Within each protocol layer, some processing may be performed and layer-specific header information is added to the SDU:s, thereby forming Protocol Data Units, PDU:s, which are forwarded to the layer below. Thus, the PDU of one layer is the SDU of the layer below it.

The MAC layer receives its data from the Radio Link Control layer, RLC, which is the layer directly above MAC. Hence, the data units that MAC receives from RLC are referred to as MAC Service Data Units or MAC SDU:s. Within the MAC layer each SDU is processed and encapsulated, i.e. MAC-specific header information is added to the data. The resulting data units are referred to as MAC Protocol Data Units, or MAC PDU:s. A MAC PDU may contain more than one MAC SDU. Once MAC finishes its processing it forwards the PDU:s on to the Physical layer for further processing and transmission.

An RLC PDU (i.e. a MAC SDU) was previously of a fixed size. However, the HSDPA technology evolved further with the introduction of higher-order modulation and multi-antenna transmission, increasing the theoretical peak data bit rate to 21 Mbps. In order to sustain such high data bit rates, a large RLC PDU size is needed. Therefore, a new MAC entity, MAC enhanced high speed (MAC-ehs), was introduced. This entity is optimized for HSPA and supports flexible RLC PDU sizes in the downlink. In other words, the transmitter may select the size of the RLC PDU freely to make the best possible use of the available radio resources. However, radio conditions can sometimes change rapidly, so that by the time an RLC PDU is actually transmitted, it is too large to be sent over the air interface with a reasonable number of HARQ retransmissions. To address this problem, MAC-ehs also supports segmentation of RLC PDU:s in the downlink, i.e. large RLC PDU:s may be split up by MAC-ehs into several smaller segments which are transmitted separately, and then concatenated back together at the receiver side.

It is desirable for the MAC protocol to support flexible RLC PDU sizes and segmentation in the uplink direction as well. In the uplink another MAC entity, improved MAC (MAC-i/is), has therefore been introduced. The MAC-i/is header includes the following MAC fields, which generally are very similar to the fields already defined for HSDPA in downlink:

A LCH-ID field comprising an identifier of the logical channel that the data belongs to (size: 4 bits).

An L field, comprising a length indicator that indicates the length of an SDU or SDU segment in the MAC PDU (size: 11 bits).

F flag, indicating if another set of LCH-ID, L, and F fields follows, i.e. if more than one SDU is present in the MAC PDU (size: 1 bit)

SS, Segmentation status field, indicating how the MAC segmentation is performed (size: 2 bits)

A TSN field, comprising a transmission sequence number. The field is used to reorder the MAC PDU:s such that they are delivered to higher layers in sequence (size: 6 bits).

Thus, the total MAC header size is 24 bits. Regardless of the exact format used, it is evident that the header contributes to a significant overhead, especially when the transmitted MAC PDU is small. Due to the introduction of flexible RLC PDU sizes and MAC segmentation in uplink, small MAC PDU:s are foreseen, especially at the cell edges where radio conditions are typically worse. The problem occurs in both the uplink and downlink directions, but is more severe in the uplink. This is because the UE has less transmission power available compared to the NodeB, and is therefore less capable of compensating for deteriorating radio conditions.

This increased overhead will result in a reduction of the coverage that the system can provide, e.g. measured as the distance from the base station that a certain bit rate can be supported, as a large part of the PDU will be occupied by header information instead of data.

SUMMARY

It is therefore an object of the present invention to provide a mechanism for improving coverage in a wireless communications system.

According to a first aspect of the present invention, the object is achieved by a method in a sending node for transmitting a data unit to a receiving node. The data unit comprises a number of bits. The sending node and the receiving node are both comprised in a wireless communications system.

According to the method, the sending node obtains a value n associated with the data unit. Then, a transmission time instance is selected depending on n, such that a function exists that uniquely associates the selected transmission time instance with n. In a further step, the data unit is transmitted to the receiving node in the selected transmission time instance without the value n.

According to a further aspect of the present invention, the object is achieved by an arrangement in a sending node for transmitting a data unit to a receiving node. The data unit comprises a number of bits. The sending node and the receiving node are both comprised in a wireless communications system.

The sending node arrangement comprises an obtaining unit, which is configured to obtain a value n associated with the data unit.

Furthermore, the sending node arrangement comprises a selecting unit. The selecting unit is configured to select a transmission time instance depending on n, such that a function exists that uniquely associates the selected transmission time instance with n.

The sending node arrangement also comprises a transmitting unit, which is configured to transmit the data unit to the receiving node in the selected transmission time instance without the value n.

According to a further aspect of the present invention, the object is achieved by a method in a receiving node for receiving a data unit from a sending node. The data unit comprises a number of bits. The sending node and the receiving node are both comprised in a wireless communications system.

In the method, the receiving node receives a transport block, which comprises some of the bits of the data unit. The transport block is received from the sending node.

Then, the receiving node determines a transmission time instance in which the transport block was transmitted.

In a subsequent step the receiving node determines a value n. The value n is determined by applying a predetermined function to the determined transmission time instance.

The receiving node then associates the value n with the received transport block according to a preconfigured rule.

According to a further aspect of the present invention, the object is achieved by an arrangement in a receiving node for receiving a data unit from a sending node. The data unit comprises a number of bits. The sending node and the receiving node are both comprised in a wireless communications system.

The receiving node arrangement comprises a receiving unit, which is configured to receive a transport block from the sending node. The transport block comprises some of the bits of the data unit.

The receiving node arrangement further comprises a transmission time determining unit, which is configured to determine a transmission time instance in which the transport block was transmitted.

Furthermore, the receiving node arrangement comprises a value determining unit. The value determining unit is configured to determine a value n, by applying a predetermined function to the determined transmission time instance.

The receiving node arrangement also comprises an associating unit, which is configured to associate the value n with the received transport block according to a preconfigured rule.

Since certain information associated with the data unit is associated with the time instance in which the data unit is transmitted, this information does need to be transmitted as part of the data unit. Thereby, the size of the data unit, and hence the overhead, is reduced. This implies that the coverage that the system may provide is increased.

An advantage of the present invention is thus that the overhead of a transmitted data unit is reduced, since certain information associated with the data unit does not need to be transmitted.

The present invention is especially advantageous when the sending node is located near a cell edge. This is because radio conditions typically deteriorate at the cell edge, resulting in smaller data unit sizes and/or increased segmenting, implying that the problem of overhead becomes more significant.

DETAILED DESCRIPTION

In order to improve throughput in a wireless communications system, the present solution reduces the overhead of a transmitted data unit, such as a MAC PDU, by associating, or coupling, certain information to the transmission time instance of the data unit. The information comprises a value n associated with the data unit. For instance, the value n may correspond to certain preselected bits in the header of the data unit. Because the receiver will be able to infer the value n (e.g. the value of the selected bit or bits) from the transmission time instance, the information does not need to be included in the header when the data unit is transmitted. Thus, the present solution reduces overhead by making it possible to omit information, e.g. one or more bits, from the transmitted data unit without losing information. The solution is applicable in the uplink as well as the downlink direction.

The invention is defined as a method and an arrangement which may be put into practice in the embodiments described below.

Figure 2:
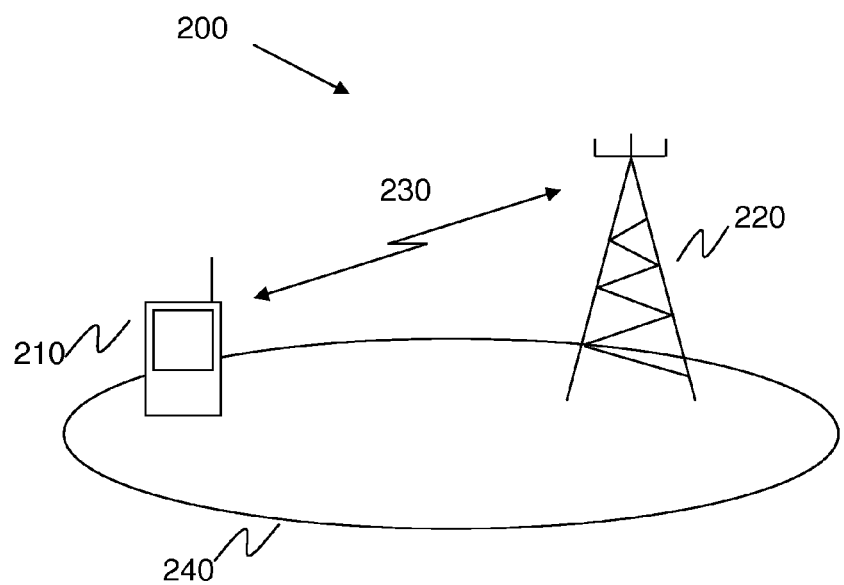
FIG. 2 is a schematic block diagram illustrating a scenario in a radio access network.

FIG. 2 shows a wireless communications system 200 comprising a sending node 210 and a receiving node 220, which sending node 210 and receiving node 220 are communicating with each other over a wireless link 230, i.e. a radio channel. The wireless communications system 200 may also comprise other nodes, with which other nodes the sending node 210 and/or the receiving node 220 may also communicate.

The wireless communications system 200 may be a WCDMA-based system such as UTRAN, but the present solution is equally applicable to other wireless systems capable of packet-switched communication, such as the Evolved Universal Terrestrial Radio Access Network (E-UTRAN) or Worldwide Interoperability for Microwave Access (WiMAX).

In the example in FIG. 2, the sending node 210 is represented by a user equipment, such as a mobile terminal, Personal Digital Assistant (PDA), portable computer or any other equipment capable of wireless transmission and reception. The receiving node 220 is represented by a base station, such as a NodeB in a UTRAN, or an eNodeB in an E-UTRAN. The receiving node 220 serves at least one cell 240, and the sending node 210 is currently within the coverage area of the cell 240. The receiving node 220 may also serve additional cells (not shown).

It should be noted that depending on the type of the wireless communication system 200, the receiving node 220 may be represented by any other suitable network node, e.g. an RNC.

The receiving node 220 is arranged to broadcast system information enabling the sending node 210, as well as other nodes currently located within the same cell 240, to determine configuration parameters such as the unique cell identity, and to synchronize with the timing of the cell. In some embodiments, where the wireless communications system 200 is a UTRAN, the receiving node 220, i.e. the NodeB, may use a logical channel called the Broadcast Common Control Channel (BCCH) to transmit system information. The system information comprises a System Frame Number (SFN), which the user equipments within the cell, e.g. the sending node 210, may use for synchronization purposes. Thus, the SFN can be viewed as a type of system clock.

Other wireless communications systems may achieve synchronization in different ways, but in general any wireless system will include a system clock that the nodes within the system may synchronize to.

Figure 3:
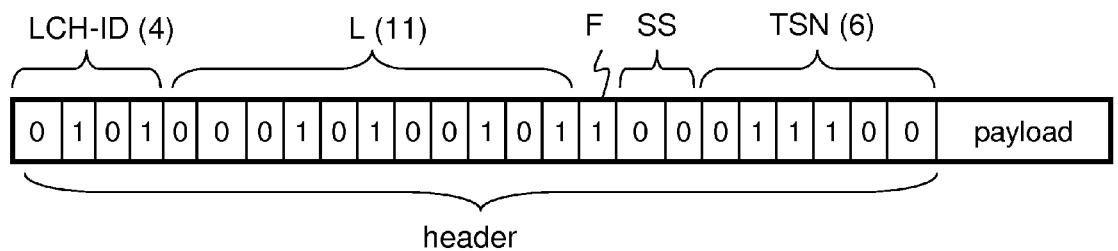
FIG. 3 is a schematic diagram illustrating a MAC PDU.

With reference to FIG. 2 and FIG. 3, the transmission of a data unit according to an embodiment of the invention will now be described.

When the sending node 210, e.g. a user equipment, has a packet of data to transmit to the receiving node 220, the packet will be processed by the upper layers in the user equipment protocol stack, until it reaches the MAC layer in the form of a MAC SDU. As previously described, the appropriate MAC entity performs some processing and adds header information to the SDU. As a result, a MAC PDU is formed, as illustrated in FIG. 3.

Figure 1:
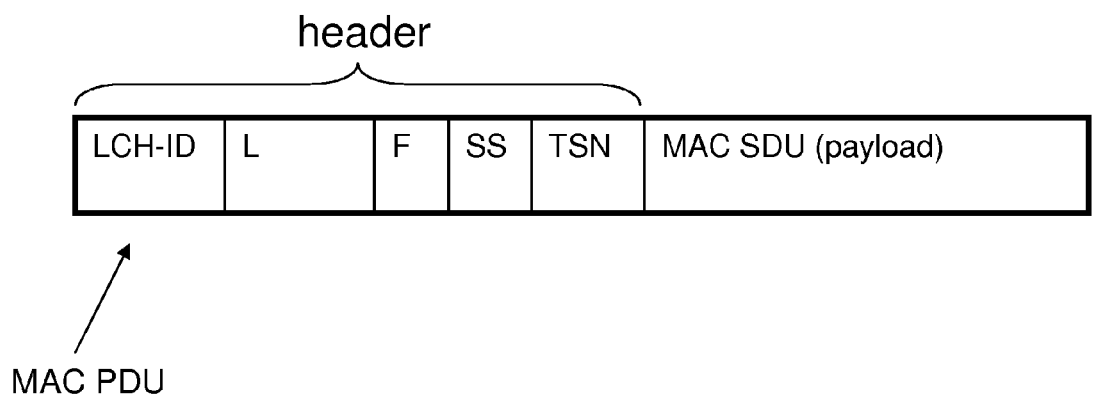
FIG. 1 is a schematic diagram illustrating a MAC PDU according to the prior art.

FIG. 3 shows an exemplary MAC PDU using the same format as depicted in FIG. 1. That is, the MAC PDU comprises the fields LCH-ID (4 bits), L (11 bits), F (1 bit), SS (2 bits), and TSN (6 bits). These fields make up the header. The MAC PDU also comprises a payload, which contains the actual data to be transmitted. In FIG. 3, the payload is depicted as a chunk of data of unspecified size, because the actual contents of the payload (MAC SDU) are not relevant to the current example.

As mentioned above, the sending node 210 has knowledge of the current frame number used in the cell, in the form of the SFN that is synchronized between the sending node 210 and the receiving node 210. By coupling (associating) information associated with the MAC PDU to a system clock such as the SFN, the size of the header may be reduced, as will now be further explained with reference to FIGS. 4-6.

In the present example, the MAC entity has been configured to associate three preselected bits with the SFN, namely the three upper (or left-most) bits of the LCH-ID parameter.

These three bits may take on eight possible binary values, i.e. 000, 001, 010, 011, 100, 101, 110, and 111, corresponding to the decimal values 0-7.

The configuration of the MAC entity could be performed in different ways:

a) It is configured by higher layers (e.g. the RRC protocol) which fields, or bits, should be coupled to SFN or b) there is a fixed rule specified in the standard.

Figure 4:
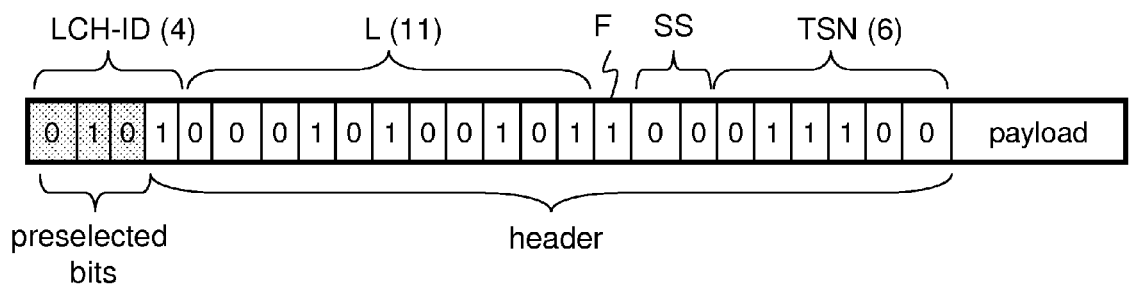
FIG. 4 is a schematic diagram illustrating a MAC PDU in accordance with some embodiments.

A mix of these configuration methods is also possible. For instance, RRC could configure the UE such that the associating of certain information with the SFN is performed only when the transmitted transport block size or PDU size is smaller than a given (preconfigured) vale. That is, the association of information with SFN would only be used for very low bitrates FIG. 4 illustrates the same MAC PDU as in FIG. 3, but the three preselected bits of the LCH-ID field have been shaded to indicate that these bits will be associated with the SFN and thus, not transmitted.

Figure 6:
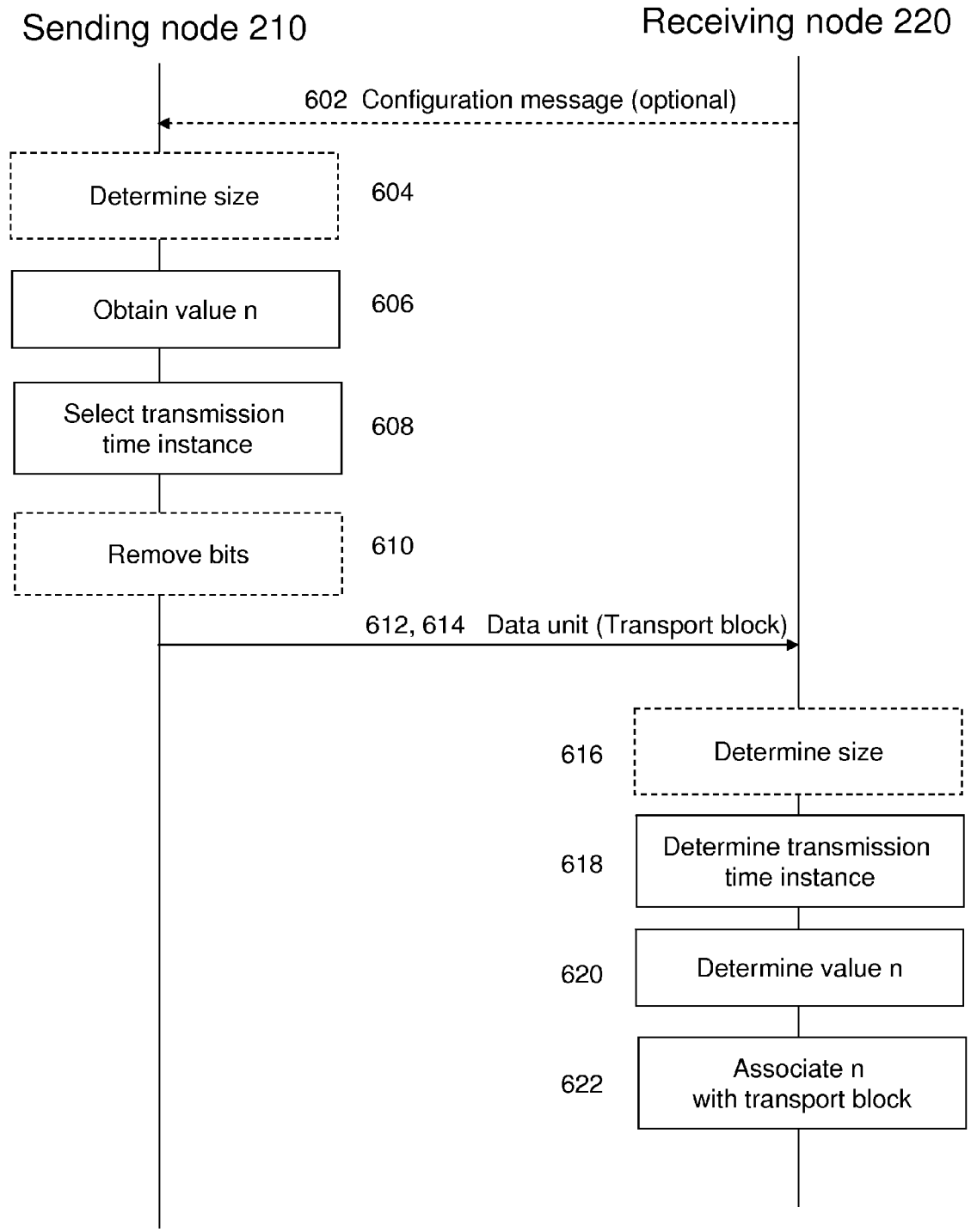
FIG. 6 is a combined signalling diagram and flow chart illustrating the transmission and reception of a data unit in accordance with some embodiments.

FIG. 6 is a combined signalling diagram and flow chart which illustrates how the sending node 210 and the receiving node 220 may interact when transmitting and receiving a data unit according to some embodiments.

Step 602 The receiving node 220 transmits a configuration message

As described above, a higher layer such as RRC could configure the "feature" of whether any information is associated with the SFN on and off in an optional first step 602. A configuration message is sent in step 602 and may potentially comprise further information such as which value or bits to associate with the SFN. The configuration message may also comprise a rule such that a certain value associated with the data unit is mapped to SFN when the transmitted PDU or transport block is smaller than a given size (i.e. it is only done for low data rates). Alternatively, such rules may be fixed in the standard.

Step 604 The sending node 210 determines the transport block size

In the embodiments where a rule has been configured such that a certain value associated with the data unit is mapped to SFN when the transmitted PDU or transport block is smaller than a given size, the sending node may determine the size of the data unit to be transmitted in an optional step 604, before deciding whether to proceed with steps 606-610.

Step 606 The sending node 210 obtains the value n

In step 606 of the method, a value n is determined, based on the preselected bits of the data unit. In the present example, the MAC layer determines that the preselected (shaded) bits have the binary values 010, corresponding to the decimal value 2.

Step 608 The sending node 210 selects a transmission time instance

Figure 5:
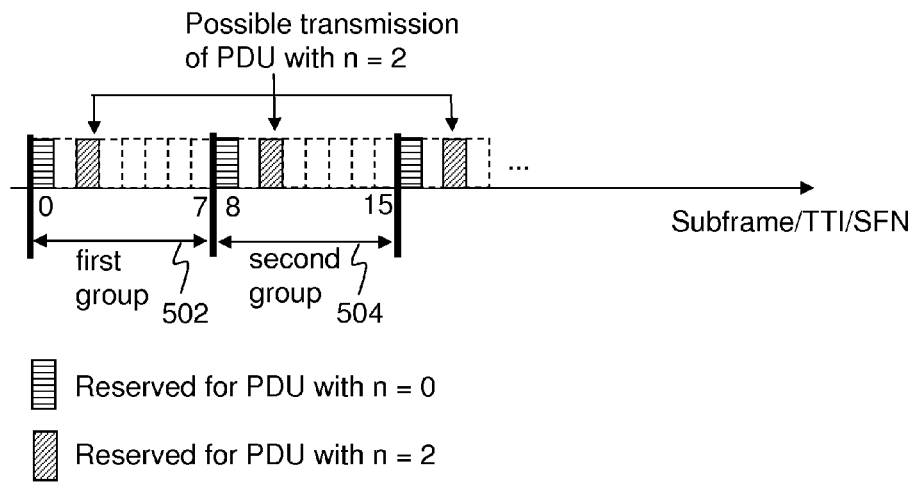
FIG. 5 is a schematic diagram illustrating the transmission of a data unit in accordance with some embodiments.

Next, in step 608 the MAC entity determines a suitable transmission time instance (e.g. a suitable SFN) for transmitting this PDU. In order for the receiver to be able to determine the values of the preselected bits with certainty, a unique time slot is reserved for each of the eight possible values of the preselected bits. One way to achieve this is to divide the sequence frame number space in groups of eight consecutive frames. In each group, one frame will be reserved for each possible value of the preselected bits. In FIG. 5, the first and second groups of eight frames are indicated by double arrows 502, 504. The first frame in each group (SFN=0, 8, 16, etc) will be reserved for transmission of PDU:s where the preselected bits have the value 0, represented by frames with horizontal lines in FIG. 5. The second frame in each group (SFN=1, 9, 17 etc) will be reserved for transmission of PDU:s where the preselected bits have the value 1 (not shown in FIG. 5), and so forth.

Determine allowable transmission time instances based on n

As described above, the MAC entity of the sending node determines a suitable SFN for transmission, based on the value n. In the present example, the value of n, i.e. the decimal representation of the preselected bits, is 2, so this PDU may be transmitted in SFN=2, 10, 18, etc, as indicated by frames with diagonal lines in FIG. 5.

The value of the preselected bits is denoted n, wherein the maximum value of n is k (that is, n ranges between 0 and k). The sending node associates the value n to a certain SFN, in such a way that (SFN mod k)=n. In other words, a PDU with the value n can only be transmitted in frames where (SFN mod k)=n.

Applied to the PDU of FIG. 4, k=8 and n=2. For SFN=10 we get (10 mod 8)=2, so this frame may be used for transmission. However, transmission in frame 11 is not allowed, because (11 mod 8)=3, which is not equal to n.

Determine next allowable transmission time instance

According to the present example, there are several possible SFN:s for transmitting the PDU. The sending node now selects which actual transmission time instance, out of the allowable SFN:s, to use for transmission. There are several possible ways of performing this selection. According to the present example, the MAC entity will first obtain the current SFN, either from the system information broadcasted by the receiving node 220, or alternatively from a storage unit within the sending node 110. The scheduler then determines the next allowable SFN for transmission of this PDU using the operations described above. For instance, if the current SFN=15, then the next allowable SFN is 18, because (18 mod 8)=2.

Step 610 The sending node 210 removes bits from the header

Prior to transmission, the preselected bits are omitted or removed from the PDU in step 610, thereby reducing the size of the header. The preselected bits no longer need to be transmitted, because they are now encoded in the selected transmission time instance.

Step 612 The sending node 210 transmits the data unit

In step 612, the sending node 210 transmits the PDU (or transport block) to the receiving node 220 in the selected transmission time instance. In the present example, the MAC entity will schedule the PDU for transmission in an allowed SFN, e.g. SFN=18, and forward it to lower layers. The physical layer will take care of transmitting the PDU toward the receiving node 220.

Step 614 The receiving node 220 receives a transport block

On the receiving side, the receiving node 220 will receive a transport block from the sending node 210 in step 614. Because certain bits have been encoded in the selected transmission time instance instead of being transmitted, the transport block comprises only some of the bits from the original data unit. In the present example, the transport block will first be received by the physical layer in the receiving node 220, and then forwarded up to the MAC layer.

Step 616 The receiving node 220 determines the transport block size

In the embodiments where a rule has been configured such that a certain value associated with the data unit is mapped to SFN when the transmitted PDU or transport block is smaller than a given size, the receiving node may determine the size of received transport block in this optional step 616, before deciding whether to proceed with steps 618-622.

Step 618 The receiving node 220 determines the transmission time instance

Next, the receiving node 220 determines the transmission time instance in which the transport block was transmitted. The receiving node 220 needs to know the transmission time instance in order to recreate the complete data unit, as will be further explained below. The receiving node 220 may, for instance, determine the transmission time instance based on the system frame number, SFN, which is maintained by both the User Equipment and the NodeB.

Step 620 The receiving node 220 determines the value n

The receiving node 220 may now determine the value n, based on the transmission time instance. In other words, the original values of the preselected bits in the transmitted data unit can be determined from the SFN in which the block of data was received. This is done by performing the same modulo operation as in the sending node 210. In the present example, n=(SFN mod k). Thus, if the block of data is received in the frame with SFN=18, and k=8, n=(18 mod 8)=2.

The rules for determining the value n are preconfigured in the receiving node 220. The configuration may be fixed in the standard, or may be performed by a higher layer such as RRC. Obviously, the receiving node 220 should be configured to use the same rules and/or settings as the sending node 210.

Step 622 The receiving node 220 associates n with the received transport block

Now, the receiving node 220 has all the information it needs to be able to recreate the complete data unit. Thus, the receiving node 220 combines the value n with the received transport block to form the data unit. In the present example, n=2 (as determined in the previous step). Decimal value 2 equals binary value 010, so these three bits are prepended to the received block of data, thereby reconstructing the header in its original form.

Figure 7:
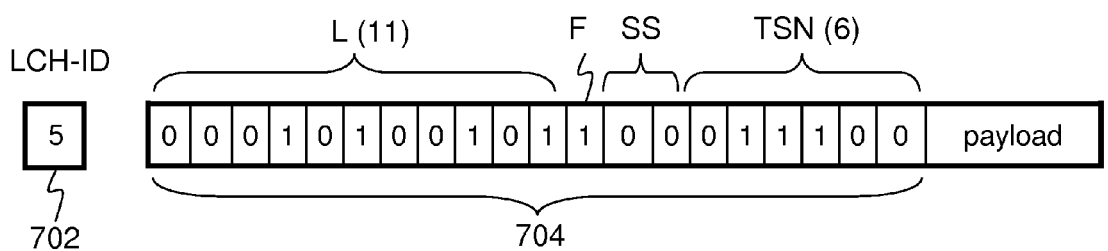
FIG. 7 is a schematic diagram illustrating a MAC PDU in accordance with some embodiments.

FIG. 7 shows another exemplary MAC PDU which is created by the sending node 220 in an alternative method for transmitting a data unit, in accordance with some embodiments. According to this example, the information to be associated with the SFN is never included in the MAC PDU header.

In a first step, the MAC entity determines whether certain information is to be associated with the transmission time instance. This may for instance be configured by RRC in optional step 602, as described above. In the present example, the MAC entity has been configured to tie the MAC parameter LCH-ID 702 to the SFN.

Referring again to FIG. 6, in an alternative step 606 the sending node 220 obtains a value n associated with the data unit.

As mentioned above, the LCH-ID field indicates the logical channel that the data unit belongs to. As the MAC layer may map several logical channels onto a common transport channel, the LCH-ID information needs to be communicated to the receiving node. In the present example, the LCH-ID 702 for this data unit is 5, i.e. the data unit belongs to logical channel number 5. Thus, n=5 in this example.

The MAC entity creates a MAC PDU header 704, comprising the fields L, F, SS and TSN. No LCH-ID field is included in the header, because the LCH-ID information is going to be mapped to the transmission time instance.

It should be noted that it is desirable, in general, to have an octet-aligned header. That is, the size of the header should be an integer number of octets. The reason for this is that modern computers typically perform their processing based on word-sized data chunks, a word being a fixed number of bytes or octets. To achieve octet-alignment it can be desirable to reduce a parameter in the MAC header by 1 or 2 bits (although an integer number of octets for the header size can also be achieved by introducing padding bits). Said parameter reduction may be done by only having parts of a MAC parameter included in the MAC header. If, for example, a MAC parameter such as LCH-ID consists of a number N of bits, a first number N1 of bits could be included in the MAC header and a second number N2 of bits are tied to the SFN (i.e. N=N1+N2). This corresponds to the embodiments described in connection with FIG. 4 above, where three bits from the LCH-ID field are associated with the SFN, and the remaining bit is included in the header.

This implies that the frequency for which data can be transmitted for a given value of the MAC parameter is increased, compared to when the entire parameter is associated with the SFN. For instance, when assuming that only one bit of the parameter is tied to SFN while the remaining bits are included in the MAC header, data can be transmitted every second TTI with a given MAC parameter value as compared to once every 8th TTI for the case that 8 bits are tied to the SFN.

Step 608 The sending node 210 selects a transmission time instance

In an alternative step 608, the sending node 210 will now select a transmission time instance for transmitting this PDU, based on the values n and k. As described above, k represents the largest possible value of n. In the present example, it is assumed that there are 10 logical channels, so k=10. This means that this PDU may be transmitted in frames where (SFN mod 10)=5. For instance, the PDU could be transmitted in SFN=0, 5, 10, 15 etc. Thus, if the current SFN=12, then the next allowable transmission time instance for this PDU is SFN=15.

In some embodiments, the MAC parameter equals [m+(SFN) mod k] for the SFN where the first transmission of the data is made. The value m is added to get a suitable value range. In a further alternative, k is selected equal to the number of HARQ processes and m is added such as to get a suitable value range (e.g. 1.8 instead of 0.7). This alternative will be further described below.

Step 612 The sending node 210 transmits the data unit

The sending node 210 transmits the data unit in an allowable SFN as described in the above example. Note that the step of removing bits from the header (step 3 above) will not be performed according to this example, because the information was never included in the header in the first place.

Steps 614-622 The receiving node 220 receives and recreates the data unit

Correspondingly, in some embodiments the receiving node 210 does not recreate the complete header. After performing steps 618-620 of determining the value n based on the transmission time instance (in the same way as described in connection with FIG. 4 above), an alternative step 622 is performed in which the receiving node 210 may act on the value n as if it had been part of the header of the received data unit, without actually including it in the header.

It is emphasized that the present solution is not dependent on the use of any particular fields or field sizes of the MAC PDU. The solution is equally applicable regardless of the PDU format.

Furthermore, although the examples above use three and four bits, respectively, of the LCH-ID field for association with the SFN, it is pointed out that would be equally possible to associate any number of bits from the LCH-ID with the SFN. Other information than the LCH-id may be tied to the transmission time instance in a similar way, e.g. TSN, Segmentation indication, or any other MAC parameter or a part thereof. The preselected bits may also span several fields (e.g. the last bit of the LCH-ID field, and the first two bits of the L field could be associated with the SFN). It should also be noted that the preselected bits do not necessarily need to occupy consecutive positions in the data unit. That is, the system could be configured to use any bits in the header as the preselected bits, e.g. bits 0, 3, and 7. Another possibility is to associate one or more bits from the payload of the data unit with the transmission time instance. In yet another alternative two or more different MAC parameters are coupled to the SFN, potentially with different k values.

In principle, k can have any value within the scope of the present invention, as long as k is at least equal to the largest possible value of n. However, according to some embodiments, the value k is chosen such that it is equal to the number of HARQ processes. To understand why this may be useful, the concept of HARQ processes will first be briefly explained.

In E-UTRAN, the HARQ protocol uses multiple stop-and-wait HARQ processes, where each process handles the transmission, and possible retransmissions, of one data unit (i.e. a MAC PDU). The purpose is to achieve continuous transmission, which would not be possible in a single stop-and-wait scheme. This is because stop-and-wait implies that after sending a PDU, the transmitter has to wait for an ACK or NACK from the receiver before performing a retransmission. Depending on the round-trip time between the transmitter and the receiver, it could take several frames for the ACK/NACK to reach the transmitter. Thus, no data can be transmitted during these frames. However, if multiple HARQ processes are used, the transmitter may use the "waiting time" to transmit (or retransmit) data in another HARQ process. Typically, about 4-8 HARQ processes is enough to achieve continuous transmission, depending on the transmission time interval, TTI (a shorter TTI reduces round-trip time). In E-UTRAN, 8 HARQ processes are used for 2 ms TTI, and 4 HARQ processes for 10 ms TTI.

Returning to the present example, as explained above, a certain PDU can only be transmitted every $k_{th}$ frame according to the present solution. Obviously, the preselected bits (which may, for instance, correspond to the LCH ID field) must have the same value both for the initial transmission and for eventual HARQ retransmissions. In the case when k=number of HARQ processes, the HARQ retransmissions are simplified. More specifically, when selecting k equal to the number of HARQ processes (i.e. 8 for 2 ms TTI and 4 for 10 ms TTI) the next allowable SFN for retransmitting the PDU (i.e. the next SFN where (SFN mod k)=n) will coincide with the next execution of the corresponding HARQ process. This is because if there are k simultaneous HARQ processes, each process will attempt to execute every $k_{th}$ frame. Note that the same HARQ process is used for the retransmission and original transmission.

The present solution is especially advantageous when the sending node, e.g. user equipment, is located near a cell edge. This is because radio conditions are typically worse at the cell edge, resulting in smaller RLC PDU sizes and/or increased segmenting, which means that the problem of overhead becomes more significant.

It should be noted that the present solution may be applied even if the data units are not segmented. However, the present solution is particularly advantageous when segmentation is performed, because segmentation typically results in increased overhead (the header size is increased by adding segmentation-related information, and at the same time the amount of data is reduced).

Although the present solution has been described in connection with the MAC layer and MAC PDU:s, it is pointed out that the solution is applicable in any protocol layer.

Figure 8:
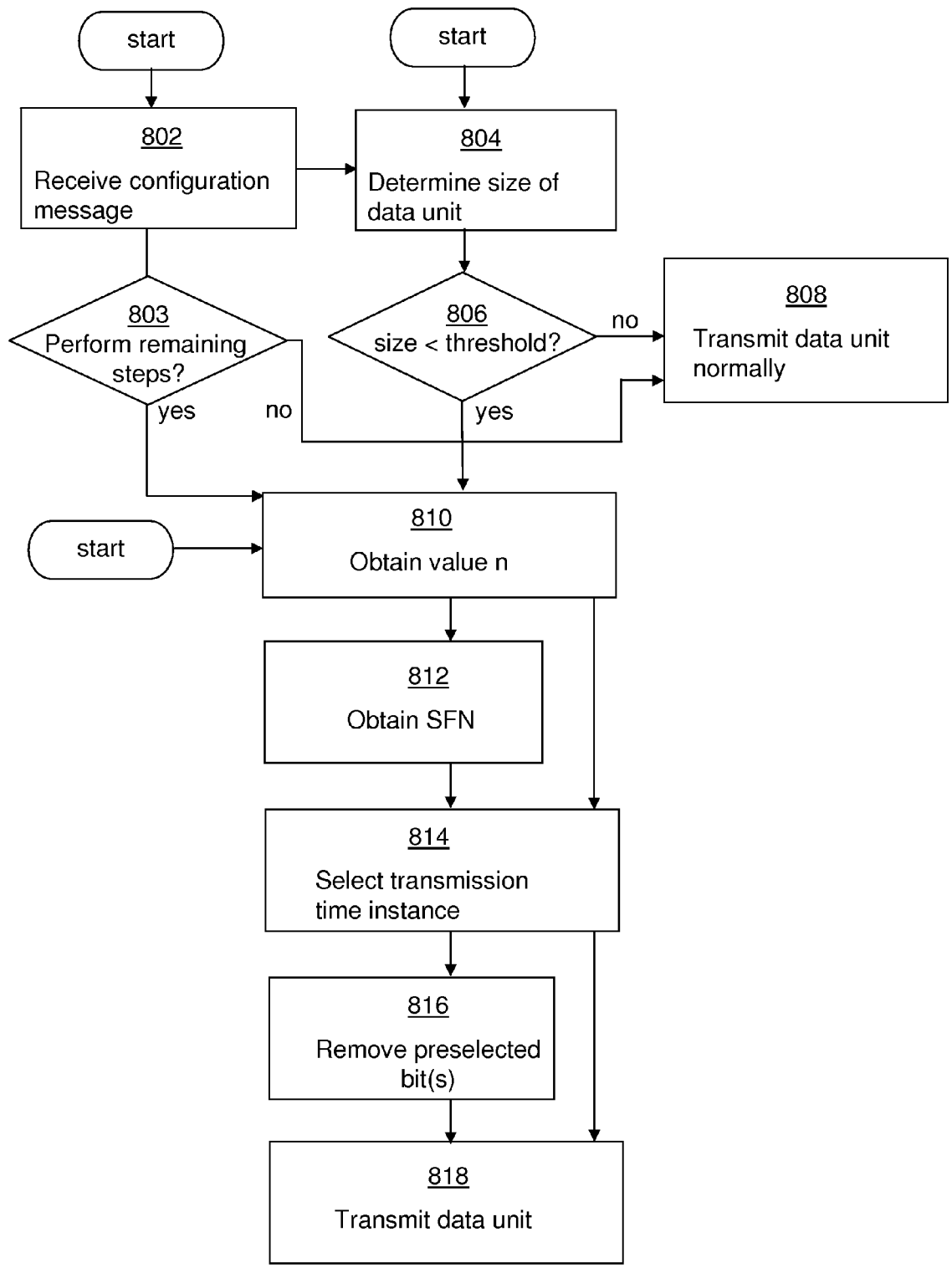
FIG. 8 is a flow chart illustrating a method for transmitting a data unit in accordance with some embodiments.

The present method steps in the sending node 210 for transmitting a data unit to a receiving node 220 will now be described with reference to a flow chart depicted in FIG. 8. The sending node 210 may, for instance, be a user equipment or a base station, e.g. a NodeB. As mentioned above, the sending node 210 and the receiving node 220 are comprised in a wireless communications system 200. The data unit to be transmitted comprises a number of bits. The method comprises the following steps:

Step 810

In a first step, the sending node 210 obtains a value n associated with the data unit.

Step 814

The sending node 210 selects a transmission time instance depending on n, such that a function exists that uniquely associates the selected transmission time instance with n.

In some embodiments, the function is a modulo function. By using a modulo function, the available transmission time instances (e.g. frame numbers) are divided into groups, where one time instance (e.g. frame) in each group is reserved for transmission of a specific value of n.

In some further embodiments, the sending node 210 selects a transmission time instance by first obtaining the current time, SFN, of a system clock associated with the sending node 210 and the receiving node 220. The sending node 210 then selects a transmission time instance SFN+t, such that (SFN+t) mod k=n. The value k is a preconfigured value representing the largest possible value of n.

In some further embodiments, k is equal to the number of HARQ processes. Thereby, HARQ retransmissions will be simplified, as the next allowable time instance for transmitting the data unit will coincide with the next time instance for retransmission, i.e. the next execution of the HARQ process.

Step 818

The sending node 210 then transmits the data unit to the receiving node 220 in the selected transmission time instance without the value n. The value n does not need to be transmitted, as it is now encoded in the transmission time instance. Thereby, the size of the data unit, and hence the overhead, is reduced.

In some embodiments, the value n is associated with the data unit header. For instance, the value n may correspond to the value of a MAC parameter.

In some further embodiments, the value n corresponds to at least one preselected bit of the number of bits comprised in the data unit header. In other words, n represents one or more bits that are part of the header. In these embodiments, the at least one preselected bit is removed from the data unit in an additional step 816, before the data unit is transmitted in step 818. These bits may be removed because they are now encoded in the selected transmission time instance, and hence do not need to be transmitted.

Step 804-806

These steps are optional. In some embodiments, the sending node determines the size of the data unit to be transmitted in a step 804, and then compares the size to a predetermined threshold in a step 806. The sending node performs the steps 810-818 of obtaining a value, selecting a transmission instance, and transmitting the data unit without the value n only if the size is below the predetermined threshold. Thus, in these embodiments the sending node has been configured to associate a certain value with the selected transmission time instance only for low data rates, i.e. when the data unit to be transmitted is smaller than a given size.

Figure 9:
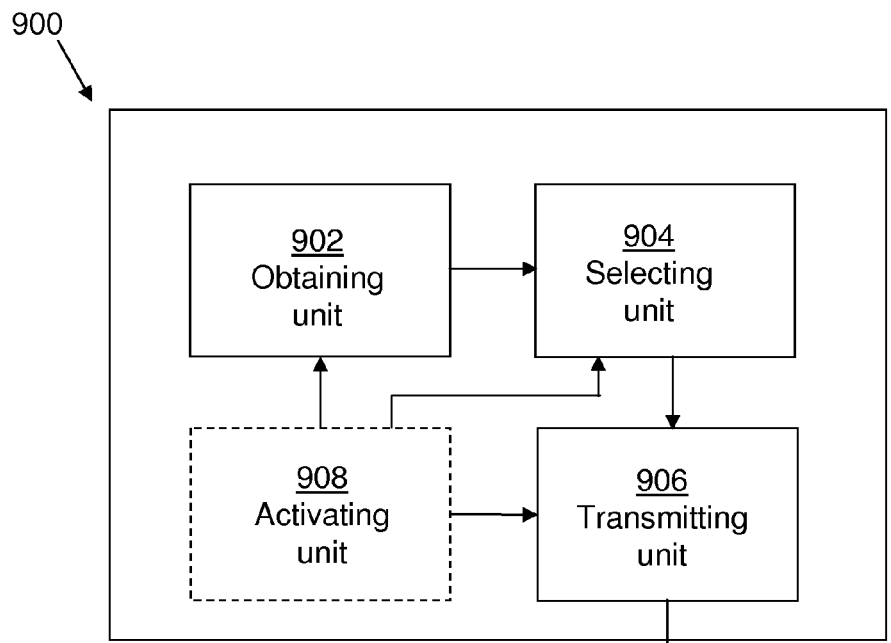
FIG. 9 is a schematic block diagram illustrating a sending node in accordance with some embodiments.

To perform the method steps for transmitting a data unit to a receiving node 220, the sending node 210 comprises an arrangement 900 depicted in FIG. 9. As mentioned above, the sending node 210 and the receiving node 220 are comprised in a wireless communications system 200. In some embodiments, the sending node 210 is a user equipment and the receiving node 220 is a base station, e.g. a NodeB. In other embodiments, the sending node 210 is a base station, e.g. a NodeB, and the receiving node 220 is a user equipment. In some embodiments, the sending node arrangement 900 is a MAC entity. The sending node arrangement 900 is to be construed as an apparatus.

The sending node arrangement 900 comprises an obtaining unit 902, configured to obtain a value n associated with the data unit.

The sending node arrangement 900 further comprises a selecting unit 904, configured to select a transmission time instance depending on n. The transmission time instance is selected such that a function exists that uniquely associates the selected transmission time instance with n.

In some embodiments, the function is a modulo function.

In some further embodiments, the selecting unit 904 is configured to obtain the current time, SFN, of a system clock associated with the sending node 210 and the receiving node 220. The selecting unit 904 is also configured to select a transmission time instance SFN+t, such that (SFN+t) mod k=n, wherein k is a preconfigured value representing the largest possible value of n.

In some embodiments, k is equal to the number of HARQ processes. As mentioned above, this has the further advantage of simplifying HARQ retransmissions.

The sending node arrangement 900 further comprises a transmitting unit 906, configured to transmit the data unit to the receiving node 220 in the selected transmission time instance without the value n.

In some embodiments, the value n is associated with the data unit header.

In some further embodiments, the value n corresponds to at least one preselected bit of the number of bits comprised in the data unit header. The transmitting unit 906 is further configured to remove the at least one preselected bit from the data unit before transmitting the data unit. Thereby, the size of the data unit, and hence the overhead, is reduced.

In some embodiments, the value n corresponds to the value of a MAC parameter.

In some embodiments, the sending node arrangement 900 further comprises an activating unit 908 configured to determine the size of the data unit to be transmitted. The activating unit 908 is also configured to compare the size to a predetermined threshold, and to activate the value obtaining unit 902, the selecting unit 904, and the transmitting unit 906 only if the size is below the predetermined threshold.

Figure 10:
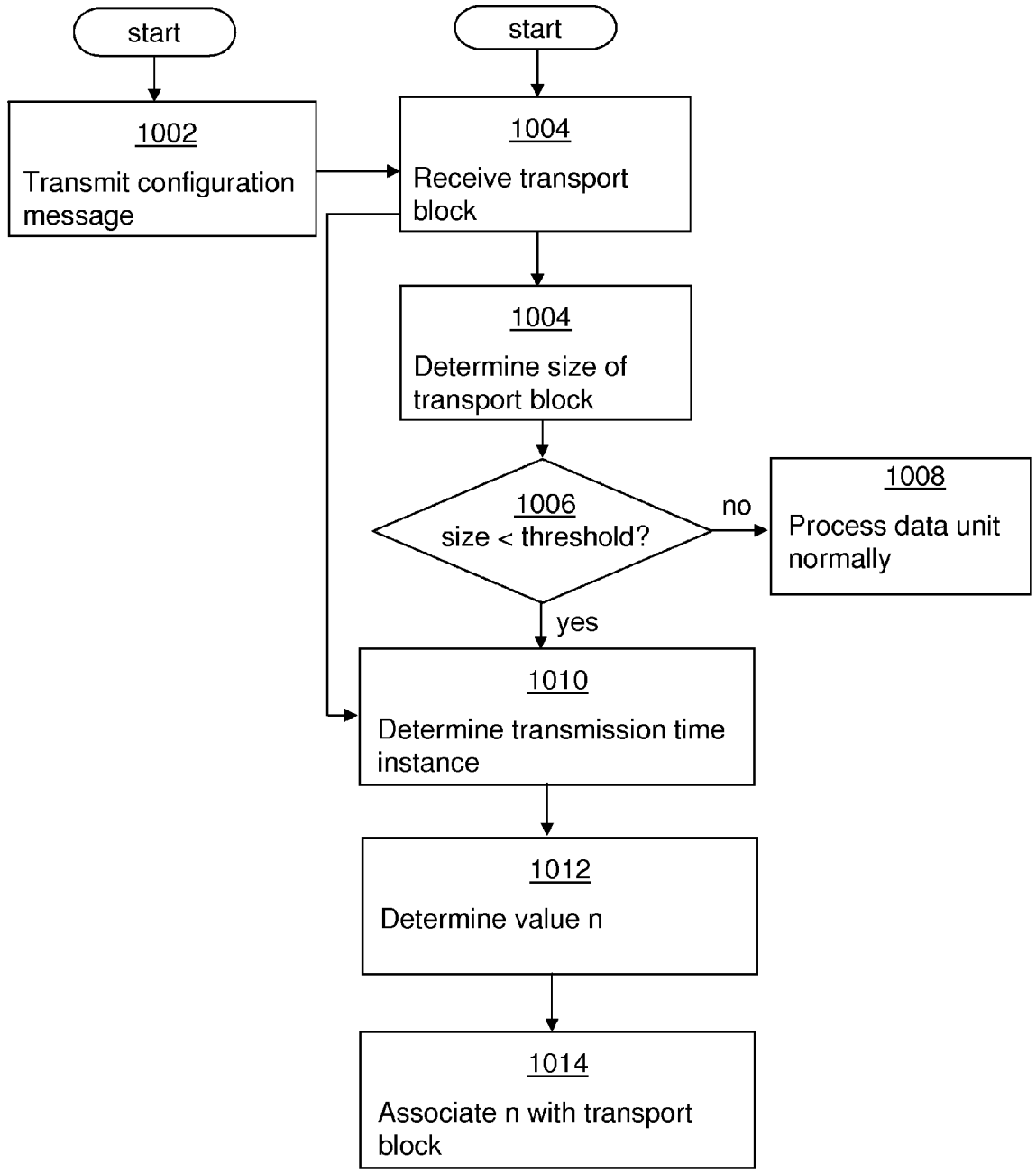
FIG. 10 is a flow chart illustrating a method for receiving a data unit in accordance with some embodiments.

The present method steps in the receiving node 220 for receiving a data unit from a sending node 210 will now be described with reference to a flow chart depicted in FIG. 10. The receiving node 210 may, for instance, be a user equipment or a base station, e.g. a NodeB. As mentioned above, the sending node 210 and the receiving node 220 are comprised in a wireless communications system 200. The data unit to be received comprises a number of bits. The method comprises the following steps:

Step 1004

The receiving node 220 receives a transport block, comprising some of the bits of the data unit, from the sending node 210. Note that the transport block does not comprise the complete data unit, as some of the information has been associated with the selected transmission time instance.

Step 1010

The receiving node 220 then determines a transmission time instance in which the transport block was transmitted.

In some embodiments the transmission time instance in which the transport block was transmitted is determined by obtaining the value of the current frame number, SFN. The current frame number used in the system is known to both the sending node 210 and the receiving node 220.

Step 1012

Next, the receiving node 220 determines a value n. This is done by applying a predetermined function to the determined transmission time instance.

In some embodiments, the predetermined function is a modulo function.

In some embodiments, the value n is determined as (SFN mod k), wherein k is a preconfigured value representing the largest possible value of n. The SFN is the system frame number obtained in previous step 1010.

In some further embodiments, k is equal to the number of HARQ processes. As mentioned above, this provides the additional advantage of simplifying the HARQ retransmissions.

Note that the determined value n corresponds to the value that the sending node 210 had previously associated with the selected transmission time instance (Step 1012 of the method in the sending node 210).

Step 1014

In a subsequent step 1014, the receiving node 220 associates the value n with the received transport block according to a preconfigured rule.

In some embodiments, this step involves associating the value n with a field in the data unit header. The field may, for instance, be a MAC parameter.

In some further embodiments, this step comprises converting the value n into a binary representation comprising at least one bit. The at least one bit is then inserted into the data unit header. Thereby, the header is reconstructed in its original form.

Step 1004-1006

These steps are optional. In some embodiments, the receiving node 220 determines the size of the received transport block in a step 1004, and then compares the size to a predetermined threshold in a step 1006. The receiving node performs the steps 1010-1014 of determining a transmission instance, determining a value n, and associating the value n with the received transport block only if the size is below the predetermined threshold. Thus, in these embodiments the receiving node has been configured to obtain a value associated with the received transport block only for low data rates, i.e. when the received transport block is smaller than a given size.

Figure 11:
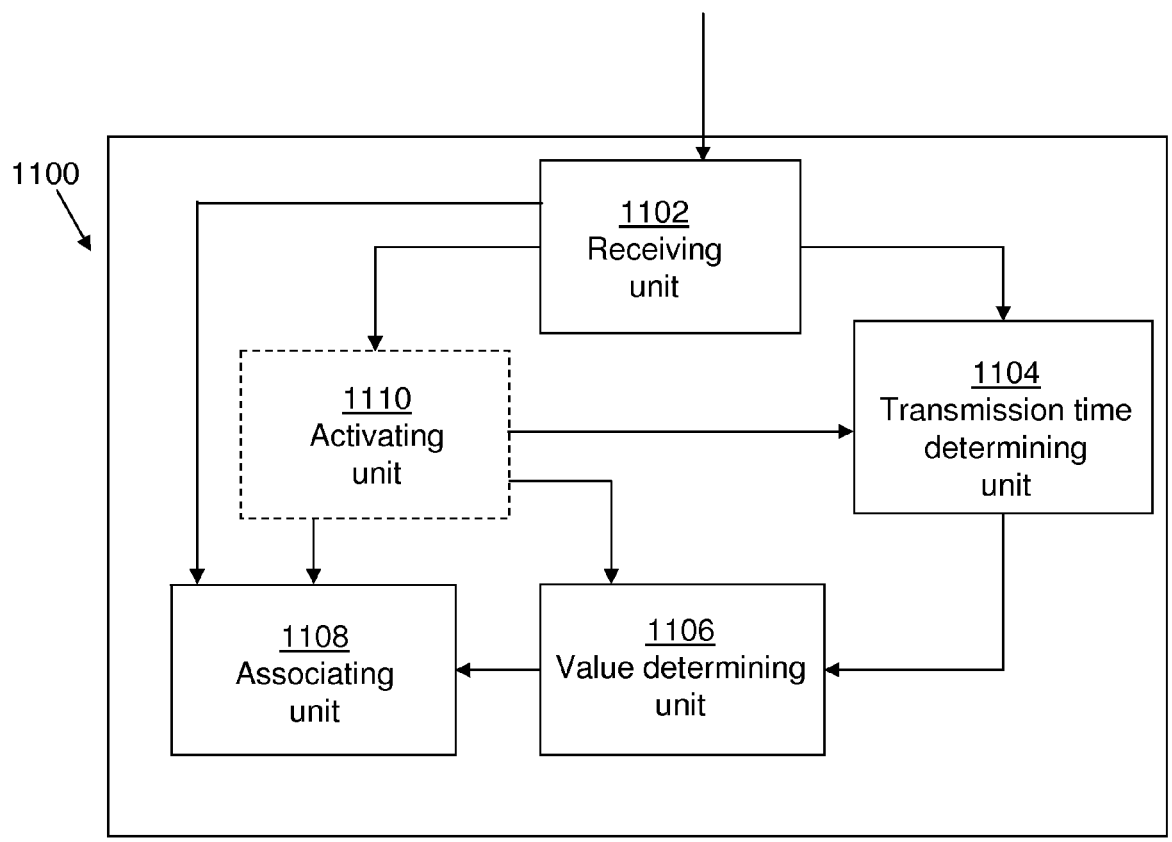
FIG. 11 is a schematic block diagram illustrating a receiving node in accordance with some embodiments.

To perform the method steps for receiving a data unit from a sending node 210, the receiving node 220 comprises an arrangement 1100 depicted in FIG. 11. As mentioned above, the sending node 210 and the receiving node 220 are comprised in a wireless communications system 200. In some embodiments, the sending node 210 is a user equipment and the receiving node 220 is a base station, e.g. a NodeB. In other embodiments, the sending node 210 is a base station, e.g. a NodeB, and the receiving node 220 is a user equipment.

In some embodiments, the receiving node arrangement 1100 is a MAC entity.

The receiving node arrangement 1100 is to be construed as an apparatus.

The receiving node arrangement 1100 comprises a receiving unit 1102 configured to receive a transport block, comprising some of the bits of the data unit, from the sending node 210.

The receiving node arrangement 1100 further comprises a transmission time determining unit 1104 configured to determine a transmission time instance in which the transport block was transmitted.

In some embodiments, the transmission time determining unit 1104 is configured to determine the transmission time instance in which the transport block was transmitted by obtaining the value of the current frame number, SFN. The value determining unit 1106 is configured to determine the value n as (SFN mod k), wherein k is a preconfigured value representing the largest possible value of n.

In some embodiments, k is equal to the number of HARQ processes.

The receiving node arrangement 1100 further comprises a value determining unit 1106 configured to determine a value n, by applying a predetermined function to the determined transmission time instance.

In some embodiments, the predetermined function is a modulo function.

The receiving node arrangement 1100 further comprises an associating unit 1108 configured to associate the value n with the received transport block according to a preconfigured rule.

In some embodiments, the associating unit 1108 is configured to convert the value n into a binary representation comprising at least one bit, and to insert the at least one bit into the data unit header.

In some embodiments, the associating unit 1108 is configured to associate the value n with a field in the data unit header. The field may, for instance, be a MAC parameter.

In some embodiments, the receiving node arrangement 1100 further comprises an activating unit 1110. The activating unit 1110 is configured to determine the size of the received transport block, to compare the size to a predetermined threshold, and to activate the transmission time determining unit 1104, the value determining unit 1106, and the associating unit 1108 only if the size is below a predetermined threshold.

The present mechanism for transmitting a data unit may be implemented through one or more processors, together with computer program code for performing the functions of the present solution. The program code mentioned above may also be provided as a computer program product, for instance in the form of a data carrier carrying computer program code for performing the present solution when being loaded into the sending node 210 or the receiving node 220. One such carrier may be in the form of a CD ROM disc. It is however feasible with other data carriers such as a memory stick. The computer program code can furthermore be provided as pure program code on a server and downloaded to the sending node 210 or the receiving node 220 remotely.

While the present invention has been described with focus on a UTRAN standardised by the 3GPP as described in Release 8 of the 3GPP specifications, this should not be seen as limiting the scope of the invention to only the aforementioned system. The present invention may be readily applied in other wireless systems including HSPA, E-UTRAN, or WiMAX.

When using the word "comprise" or "comprising" it shall be interpreted as non-limiting, i.e. meaning "consist at least of".

The present invention is not limited to the above-describe preferred embodiments. Various alternatives, modifications

The invention claimed is:

1. A method in a sending node for transmitting a data unit to a receiving node, the data unit comprising a number of bits, the sending node and the receiving node being comprised in a wireless communications system, the method comprising the following steps:
   obtaining a value n associated with the data unit;
   selecting a transmission time instance depending on n, such that a function exists that uniquely associates the selected transmission time instance with n; and
   transmitting the data unit to the receiving node in the selected transmission time instance without the value n.

2. The method according to claim 1, wherein the function is a modulo function.

3. The method according to claim 2, wherein the step of selecting a transmission time instance comprises the steps of obtaining the current time (SFN) of a system clock associated with the sending node and the receiving node, and selecting a transmission time instance SFN+t, such that (SFN+t) mod k=n, wherein k is a preconfigured value representing the largest possible value of n.

4. The method according to claim 3, wherein k is equal to the number of HARQ processes.

5. The method according to claim 1, wherein the value n is associated with the data unit header.

6. The method according to claim 5, wherein the value n corresponds to at least one preselected bit of the number of bits comprised in the data unit header, and comprising the additional step of removing the at least one preselected bit from the data unit before transmitting the data unit.

7. The method according to claim 5, wherein the value n corresponds to the value of a MAC parameter.

8. The method according to claim 1, further comprising the steps of:
   determining the size of the data unit to be transmitted;
   comparing the size to a predetermined threshold; and
   performing the steps of obtaining a value, selecting a transmission instance, and transmitting the data unit without the value n only if the size is below the predetermined threshold.

9. The method according to claim 1, wherein the sending node is a user equipment.

10. The method according to claim 1, wherein the sending node is a base station.

11. A method in a receiving node for receiving a data unit from a sending node, the data unit comprising a number of bits, the sending node and the receiving node being comprised in a wireless communications system, the method comprising the following steps:
    receiving a transport block, comprising some of the bits of the data unit, from the sending node;
    determining a transmission time instance in which the transport block was transmitted;
    determining a value n corresponding to one or more bits comprised in the data unit, by applying a predetermined function to the determined transmission time instance; and
    associating the value n with the received transport block according to a preconfigured rule.

12. The method according to claim 11, wherein the predetermined function is a modulo function.

13. The method according to claim 11, wherein the transmission time instance in which the transport block was transmitted is determined by obtaining the value of the current frame number (SFN) and wherein the value n is determined as (SFN mod k), wherein k is a preconfigured value representing the largest possible value of n.

14. The method according to claim 13, wherein k is equal to the number of HARQ processes.

15. The method according to claim 11, wherein the step of associating comprises converting the value n into a binary representation comprising at least one bit, and inserting the at least one bit into the data unit header.

16. The method according to claim 11, wherein the step of associating involves associating the value n with a field in the data unit header.

17. The method according to claim 16, wherein the field is a MAC parameter.

18. The method according to claim 11, further comprising the steps of:
    determining the size of the received transport block;
    comparing the size to a predetermined threshold; and
    performing the steps of determining a transmission time instance, determining a value n, and associating the value n with the received transport block only if the size is below a predetermined threshold.

19. The method according to claim 11, wherein the receiving node is a user equipment.

20. The method according to claim 11, wherein the receiving node is a base station.

21. An arrangement in a sending node for transmitting a data unit to a receiving node, the data unit comprising a number of bits, the sending node and the receiving node being comprised in a wireless communications system, wherein the sending node arrangement comprises:
    an obtaining unit, configured to obtain a value n associated with the data unit;
    a selecting unit, configured to select a transmission time instance depending on n, such that a function exists that uniquely associates the selected transmission time instance with n; and
    a transmitting unit, configured to transmit the data unit to the receiving node in the selected transmission time instance without the value n.

22. The sending node arrangement according to claim 21, wherein the selecting unit is configured to obtain the current time (SFN) of a system clock associated with the sending node and the receiving node, and to select a transmission time instance SFN+t, such that (SFN+t) mod k=n, wherein k is a preconfigured value representing the largest possible value of n.

23. The sending node arrangement according to claim 21, wherein the sending node is a user equipment.

24. The sending node arrangement according to claim 21, wherein the sending node arrangement is a MAC entity.

25. An arrangement in a receiving node for receiving a data unit from a sending node, the data unit comprising a number of bits, the sending node and the receiving node being comprised in a wireless communications system, and wherein the receiving node arrangement comprises:
    a receiving unit configured to receive a transport block, comprising some of the bits of the data unit, from the sending node;
    a transmission time determining unit configured to determine a transmission time instance in which the transport block was transmitted;
    a value determining unit configured to determine a value n corresponding to one or more bits comprised in the data unit, by applying a predetermined function to the determined transmission time instance; and an associating unit configured to associate the value n with the received transport block according to a preconfigured rule.

26. The receiving node arrangement according to claim 25, wherein the transmission time determining unit is configured to determine the transmission time instance in which the transport block was transmitted by obtaining the value of the current frame number (SFN) and wherein the value determining unit is configured to determine the value n is determined as (SFN mod k), wherein k is a preconfigured value representing the largest possible value of n.

27. The receiving node arrangement according to claim 25, wherein the receiving node is a base station.

28. The receiving node arrangement according to claim 25, wherein the receiving node arrangement is a MAC entity.

* * * * *

UNITED STATES PATENT AND TRADEMARK OFFICE
CERTIFICATE OF CORRECTION

PATENT NO. : 8,634,315 B2  
APPLICATION NO. : 12/864850  
DATED : January 21, 2014  
INVENTOR(S) : Torsner et al.

Page 1 of 2

It is certified that error appears in the above-identified patent and that said Letters Patent is hereby corrected as shown below:

On the Title Page, Item (75), under "Inventors", in Column 1, Line 2, delete "Sagfors," and insert -- Sågfors, --, therefor.

On the Title Page, Item (75), under "Inventors", in Column 1, Line 3, delete "Kyrkslatt" and insert -- Kyrkslätt --, therefor.

In the Drawings

In Fig. 1, Sheet 1 of 7, delete "FIG" and insert -- FIG. --, therefor at each occurrence throughout the figures.

In the Specification

In Column 2, Line 33, delete "bit)" and insert -- bit). --, therefor.

In Column 2, Line 35, delete "bits)" and insert -- bits). --, therefor.

In Column 5, Line 61, delete "receiving node 210." and insert -- receiving node 220. --, therefor.

In Column 6, Line 16, delete "bitrates" and insert -- bitrates. --, therefor.

In Column 8, Line 37, delete "sending node 220" and insert -- sending node 210 --, therefor.

In Column 8, Line 49, delete "sending node 220" and insert -- sending node 210 --, therefor.

In Column 9, Lines 49-50, delete "receiving node 210" and insert -- receiving node 220 --, therefor.

In Column 9, Line 54, delete "receiving node 210" and insert -- receiving node 220 --, therefor.

Signed and Sealed this  
Twenty-second Day of July, 2014

Michelle K. Lee  
*Deputy Director of the United States Patent and Trademark Office*

CERTIFICATE OF CORRECTION (continued)
U.S. Pat. No. 8,634,315 B2

In Column 9, Line 65, delete "LCH-id" and insert -- LCH-ID --, therefor.

In Column 12, Line 56, delete "receiving node 210" and insert -- receiving node 220 --, therefor.